United States Patent [19]
Spinosa et al.

[11] 4,158,907
[45] * Jun. 26, 1979

[54] SNAP ASSEMBLY

[75] Inventors: Dominic J. Spinosa, Wantagh; Frank Knoll, Huntington Station, both of N.Y.

[73] Assignee: East/West Industries, Inc., Farmingdale, N.Y.

[*] Notice: The portion of the term of this patent subsequent to Feb. 21, 1995, has been disclaimed.

[21] Appl. No.: 854,010

[22] Filed: Nov. 22, 1977

Related U.S. Application Data

[63] Continuation-in-part of Ser. No. 751,320, Dec. 16, 1976, Pat. No. 4,074,401.

[51] Int. Cl.² .......................................... A44B 13/02
[52] U.S. Cl. ................................. 24/236; 24/201 HE
[58] Field of Search .................... 24/236, 231, 73 HR, 24/265 H

[56] References Cited

U.S. PATENT DOCUMENTS

| | | | |
|---|---|---|---|
| 49,654 | 8/1865 | Saladee | 24/236 |
| 61,737 | 2/1867 | Hotchkiss | 24/236 |
| 193,950 | 8/1877 | Heath | 24/236 |
| 196,939 | 11/1877 | Sabin | 24/265 H |
| 280,283 | 6/1883 | Blake | 24/236 |
| 720,378 | 2/1903 | Phillips | 24/236 |
| 879,272 | 2/1908 | Key | 24/236 |
| 998,943 | 7/1911 | Armstrong | 24/236 |
| 4,074,401 | 2/1978 | Spinosa | 24/201 HE |

*Primary Examiner*—Bernard A. Gelak
*Attorney, Agent, or Firm*—Leonard W. Suroff

[57] ABSTRACT

A snap assembly adapted to receive a cooperating buckle element is disclosed in which a base is provided having oppositely disposed front and rear ends with upper and lower surfaces intermediate the ends, and a hook is integrally formed with the front end of the base and extending inwardly in the direction of the rear end and terminating in a distal end. The base includes a front section and a rear section angularly disposed with respect thereto with a harness or the like extending from the rear section. The hook having an inner surface bounding one side of the hook facing the upper surface of the base for forming an enclosure for receiving a buckle element therein with a harness extending therefrom. The enclosure includes a central axis extending transversely between the sides and in substantial longitudinal alignment with the rear section such that racking of the snap assembly is prevented when the buckle element abuts against the hook when a force is applied to each harness in opposite or opposing directions. A flexible locking member is adapted to be moved relative to the inner surface of the hook, with the locking member having an outer end and an oppositely disposed free end. The outer end formed by a wall having one surface thereof extending in overlapping relationship with and secured to the base. Resilient means for continuously urging the free end of the locking member into abutting pressural engagement with the inner surface of the hook and being movable toward and away from the inner surface is provided.

23 Claims, 13 Drawing Figures

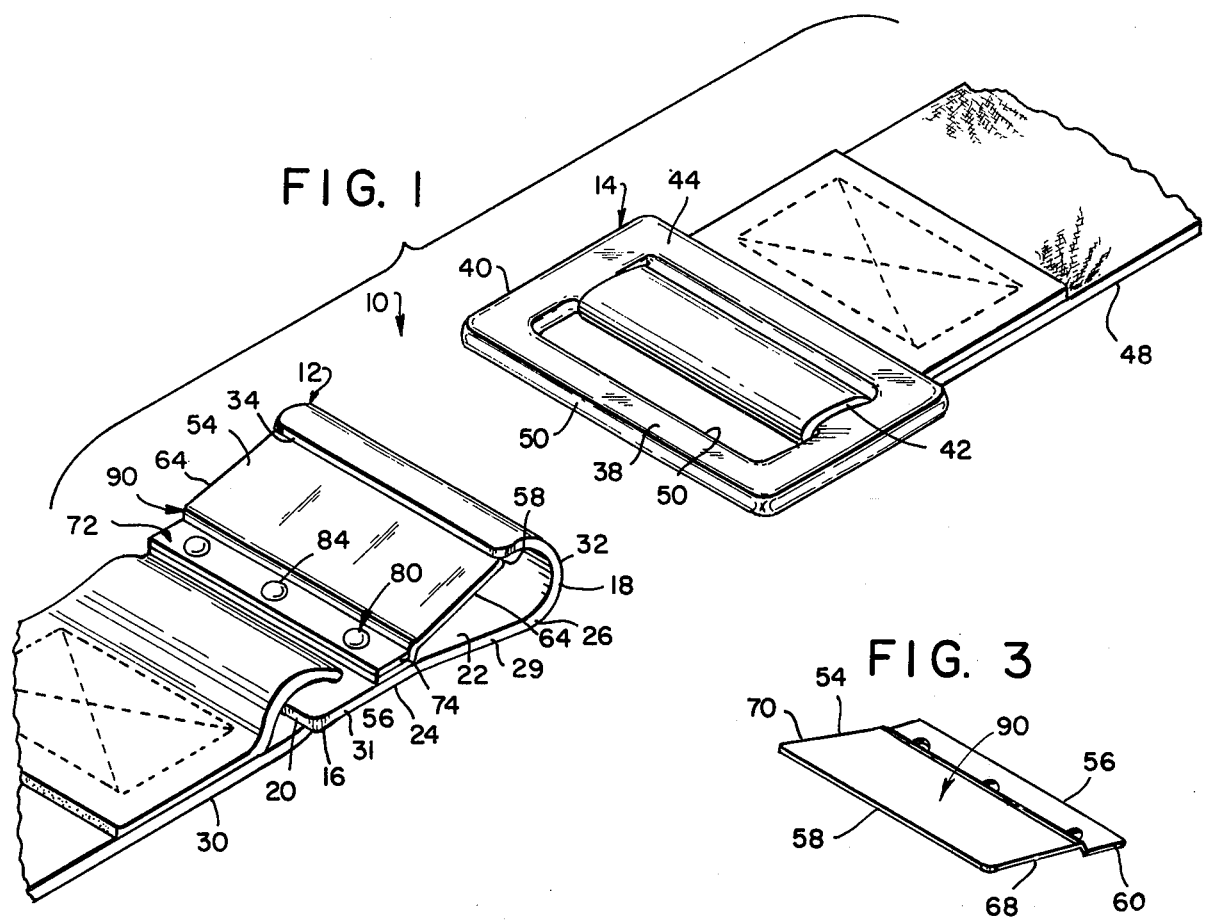
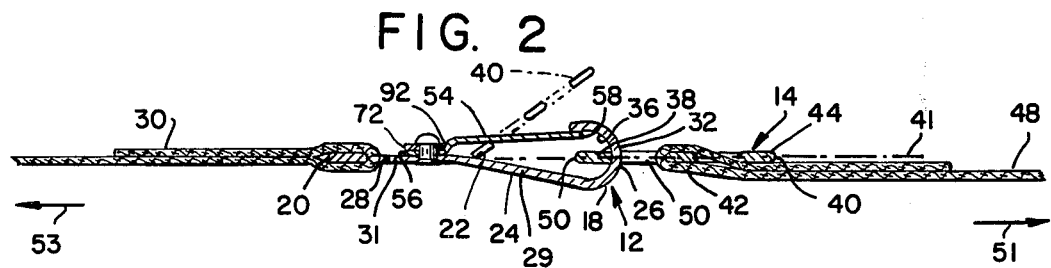
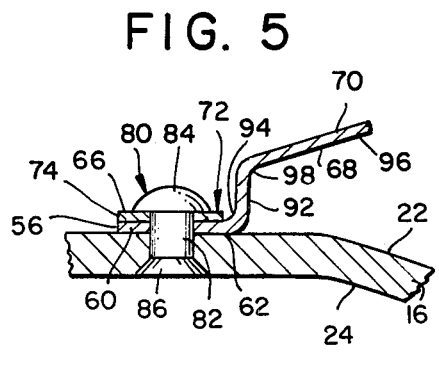
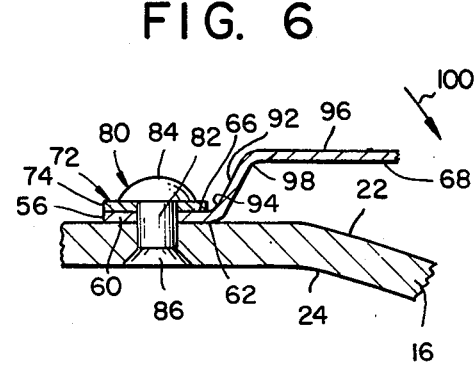

SNAP ASSEMBLY

CROSS REFERENCE TO RELATED APPLICATION

This application is a continuation-in-part of our co-pending patent application Ser. No. 751,320 filed Dec. 16, 1976, now U.S. Pat. No. 4,074,401, issued Feb. 21, 1978 which entire subject matter of the co-pending application is incorporated herein by reference as if fully set forth herein.

BACKGROUND OF THE INVENTION

1. Field of the Invention

The present invention relates to a snap and buckle assembly, and more particularly an assembly ideally suited for high load conditions such as in a parachute system.

2. Description of the Prior Art

The various forms of coupling devices generally illustrated in the prior art are primarily directed to those applications that do not require the ability to withstand high loads. Accordingly, certain features of these prior art devices do not lend themselves to the unique problems when a snap assembly is to be utilized for example as part of a parachute system. The inventors have found that due to the load conditions, the stress factor is substantially increased in the moving locking member of the assembly. In contrast to the prior art devices, there is provided resilient means to obtain a high strength, quick release, snap connection, in which the stress concentrations are properly distributed.

In accordance with the present invention, there is provided racking means such that when the load is applied to each harness associated with the asssembly in opposite directions the forces are in longitudinal alignment with each other and angular movement of the assembly is prevented. A snap assembly having this feature in combination with the other novel features of the present invention, provides for an improved snap assembly superior to those disclosed in the prior art.

Although the present invention is ideally suited for high load conditions, such as in a parachute system, it will be appreciated that whenever a quality snap assembly is required, irrespective of its use or application, the present invention will provide such a device.

OBJECTS OF THE INVENTION

An object of the present invention is to provide a snap assembly ideally suited for high load conditions and in which the buckle is readily inserted in the assembly and maintained in the proper load position.

Another object of the present invention is to provide a snap assembly which receives a buckle and the dimensional relationship prevents the buckle from binding, wedging, locking, or falling into any incorrect position which would result in a malfunction.

Another object of the present invention is to provide a snap assembly in which the flexible locking member is provided with a double form portion in order to provide resilient means with the stress concentration equally distributed over the respective portions of the locking member.

Another object of the present invention is to provide a snap and buckle assembly that is readily assembled and disassembled such that the buckle may be easily inserted and also permit ready movement of the buckle relative to the snap assembly for positioning in various locations.

Other objects and advantages of the present invention will become apparent as the disclosure proceeds.

SUMMARY OF THE INVENTION

A snap assembly adapted to receive a cooperating buckle element is disclosed in which a base is provided having opposite-disposed front and rear ends with upper and lower surfaces intermediate the ends, and a hook is integrally formed with the front end of the base and extending inwardly in the direction of the rear end and terminating in a distal end. The base includes a front section and a rear section angularly disposed with respect thereto with a harness or the like extending from the rear section. The hook having an inner surface bounding one side of the hook facing the upper surface of the base for forming an enclosure for receiving a buckle element therein with a harness or the like extending therefrom. The enclosure includes a central axis extending transversely between the sides and in substantial longitudinal alignment with the rear section such that racking of the snap assembly is prevented when the buckle element abuts against the hook when a force is applied to each harness in opposite or opposing directions.

A flexible locking member is adapted to be moved relative to the inner surface of the hook, with the locking member having an outer end and an oppositely disposed free end. The outer end formed by a wall having one surface thereof extending in overlapping relationship with and secured to the base.

Resilient means for continuously urging the free end of the locking member into abutting pressural engagement with the inner surface of the hook and being movable toward and away from the inner surface is provided. The resilient means, in accordance with one embodiment of the invention, comprises a rib integrally joined by an arcuate configuration at one end thereof with the wall and extending upwardly therefrom, and a clip integrally joined by an arcuate configuration at one end thereof with the other end of the rib. The clip terminates in the free end of the locking member and is inclined upwardly relative to the base for movement relative thereto. The movement of the locking member provides an angle of deflection in the clip and in the rib so as to obtain a relatively large translation of the free end of the locking member while maintaining a relatively low stress concentration in the locking member by distribution of the stress in each of the arcuate configurations.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the snap and buckle assembly in detached condition prior to assembly thereof;

FIG. 2 is a side plan view of the snap and buckle assembly coupled to each other;

FIG. 3 is a perspective view of the locking member utilized in the snap and buckle assembly illustrated in the embodiment of FIG. 2;

FIG. 5 is a fragmentary enlarged view illustrating the mounting and dimensional relationship of the locking member;

FIG. 6 is a view similar to FIG. 5 illustrating the locking member disposed in a depressed condition;

DETAILED DESCRIPTION OF THE DRAWINGS

Figure 4:
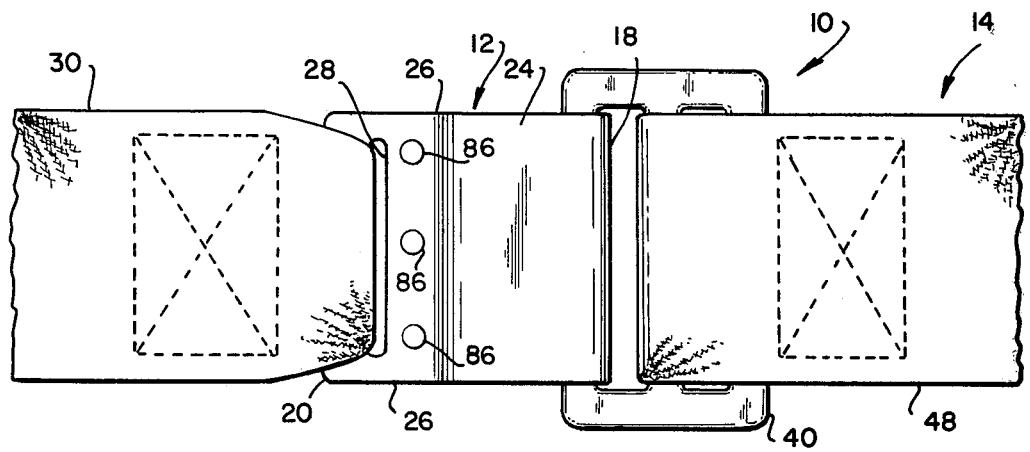
FIG. 4 is a bottom plan view of the snap and buckle assembly illustrated in FIG. 2.

Referring to the drawings, and initially to FIGS. 1 through 6, there is illustrated one embodiment of the present invention including a snap and buckle assembly 10. The snap assembly 12 and buckle assembly 14 are designed to be readily assembled and disassembled from each other. The snap assembly 12 includes a base 16 having oppositely disposed front end 18 and rear end 20 with upper and lower surfaces 22 and 24, respectively, intermediate the ends 18 and 20. A pair of sides 26 extend between the ends 18 and 20. A slot 28 extends transversely on the base 16 adjacent the rear end 20 between the sides 26 for receiving a harness or strap 30 therein in a conventional manner.

The base 16 includes a front portion or section 29 and a rear portion or section 31 integrally formed with each other. The front section 29 terminates at the front end 18 and the rear section 31 terminates at the rear end 20. The front section 29, as illustrated in FIGS. 1 and 2, is angularly disposed or inclined relative to the rear section 31. The angle of inclination is selected in a manner hereinafter described.

A hook 32 is integrally formed with the front end 18 of the base 16 and extends inwardly in the direction of the rear end 20 and terminates in a distal end 34. The hook 32 has an inner surface 36 bounding one side of the hook 32 facing the upper surface 22 of the base 16 for forming an enclosure for receiving the buckle element 38 of the buckle assembly 14. The buckle assembly 14 includes a buckle member 40 having additional buckle elements 42 and 44 with a harness or strap 48 secured in a conventional manner to buckle element 42.

The inner surface 36 of the hook 32 having an arcuate configuration at the front end 18 of the base 16. To permit movement of the buckle element 38 within the spacing defined, the dimension between the opposing end walls 50 of buckle element 38 is selected to be less than the distance between the inner surface 36 and upper surface 22. In this manner the buckle member 40 may readily take the position illustrated by the broken lines in FIG. 2. This is important in order to permit ready movement of the buckle member 40 without the possibility of any binding, wedging, or locking. It is most important that the buckle member 40 be ready for immediate use when same is required.

The enclosure formed by the hook 32 is such that the inner surface 36 has a central or neutral axis 41, as illustrated in FIG. 2, extending transversely between the sides 26 and in substantial longitudinal alignment with the rear section 31. In this manner racking of the snap and buckle assembly 10 is prevented when the buckle element 38 abuts against the inner surface 36 when oppositely directed forces, illustrated by arrows 51 and 53, are concurrently applied to harness 30 and 48, respectively. The front section 29 is inclined relative to the rear section 31 in order to permit the formation of the hook 32 with the central axis 41 as described above. In this manner in the position illustrated in FIG. 2 the buckle element 38 is in longitudinal alignment with the rear section 31 of the base 16. This relationship also aligns the harness 30 with the harness 48 as they extend around the person or object being secured by the snap and buckle assembly 10.

In operative relationship with the hook 32, there is provided a flexible locking member 54 adapted to be moved relative to the inner surface 36 of the hook 32. The locking member 54 has an outer end 56 and an oppositely disposed free end 58. The outer end 56 formed by a wall 60 having one surface 62 thereof extending in overlapping relationship to the upper surface 22 of the base 18. The locking membr 54 may be of a width substantially equal to the width of the base 16 as defined by the spaced apart sides 26. In this manner the spaced apart sides 64 of the locking member 54 may be of the same width as the base 16. The wall 60 has a spaced apart upper surface 66, as illustrated in FIGS. 5 and 6.

In order to provide the desired spring loading characteristics to the flexible locking member 54, it is formed from a relatively thin sheet of material. For example, the thickness of the locking member between the opposed surfaces 68 and 70 may be 0.010 inches. Obviously this dimension may vary with the selected function and load characteristics to which the assembly 10 is to be subjected. The thickness of the base 16 as defined by the opposing surfaces 22 and 24 may be approximately 0.036 inches, and this dimension may also vary. Having established this dimensional relationship, it can be appreciated that the wall portion 60 has to be secured to the base 16 in such a manner that when the free end 58 of the locking member 54 is deflected, the stress is evenly distributed.

The inventors have found that it is necessary to provide load distribution means 72 extending in overlapping relationship to the oppositely disposed surface 66 of the wall 60. The load distribution means 72 may include a rectangular plate 74 in order to sandwich the wall 60 between the plate 74 and the base 16. There is provided coupling means 80 utilized in conjunction with the load distribution means 72 to obtain the rigid coupling required such that any load on the wall 60 is substantially equally distributed thereacross. The coupling means may include a plurality of spaced apart fasteners 82 that may be in the form of rivets having a head 84 at one end thereof and a countersunk portion 86 at the opposite end thereof, as illustrated in FIGS. 5 and 6. Appropriate apertures are provided in plate 74, wall 60, and base 16 to receive the fasteners therethrough. Various metals well-known in the art may be utilized to fabricate the snap assembly 12.

Without the provision of the load distribution means 72, it was found that cracking occurred around the apertures in the wall 60, It must be appreciated that for aircraft applications, such as in a parachute system, loads as high as 2,000 pounds may be transmitted to the assembly 10. It is with these load characteristics in mind that the inventors set out to provide an assembly that would not be subject to material fatigue and fracture.

To avoid a stress buildup in the locking member 54 and simultaneously permitting the necessary translation of the free end 58, there has been provided resilient means 90 for continuously urging the free end 58 of the locking member 54 into pressural abutting engagement with the inner surface 36 of the hook 32 and being movable toward and away from the inner surface 36.

The resilient means 90 comprises a rib 92 integrally joined by an arcuate configuration 94 at one end thereof with the wall 60 and extending upwardly therefrom. A clip 96 is integrally joined by an arcuate configuration 98 at one end thereof with the other end of the rib 92. The clip 96 terminates in the free end 58 of the locking member 54 is inclined upwardly relative to the base 16 for movement relative thereto. The movement of the locking member 54 provides an angle of deflection in the clip 96 and in the rib 92 so as to obtain a relatively large translation of the free end 58 of the locking member 54 while maintaining a relatively low stress concentration in the locking member 54 by distribution of the stress in each arcuate configuration 94 and 98, respectively.

By providing this double bend relationship, it is possible to distribute the bending stress over the arcuate configuration 94 and 98. The arcuate configuration 94 and 98 may be substantially conformal to each other and formed of a radius in the range of 0.010 inches to 0.100 inches. For the thickness of material for the locking member 54, as discussed above, a bend radius of 0.060 inches may be utilized. This provides a stiffness characteristic to the clip 96 and rib 92 such that the angle of deflection of the clip from the position illustrated in FIG. 5 to that illustrated in FIG. 6, by the movement in the direction of arrow 100, causes substantially equal deflection of the rib 92.

In this manner the rib 92 becomes inclined with respect to wall 60 an amount equal to displacement of the clip 96 as it is moved into the position of FIG. 6. It has been found that this arrangement provides a relatively low stress concentration in each of the corners defined by the arcuate configuration 94 and 98. At the same time there is sufficient resilience in the locking member 54 to return to its initial position illustrated in FIG. 1 after the manual force applied to deflect it has been released.

If desired, the radius defined by the arcuate configuration 94 and 98 may be varied such that the angle of inclination of clip 96 and rib 92 need not be equal, but yet the same desired end result of a low stress concentration may be obtained. In effect, the stress buildup is now being dissipated along two corners rather than one corner as is well known in the prior art.

Figure 7:
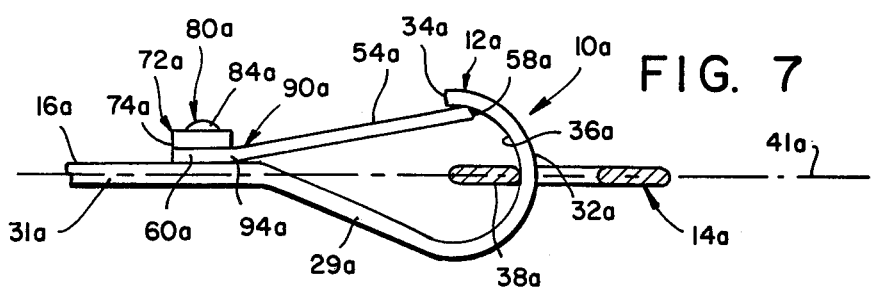
FIG. 7 is a fragmentary side plan view of a snap and buckle assembly, similar to FIG. 2, illustrating another embodiment of the present invention.
Figure 8:
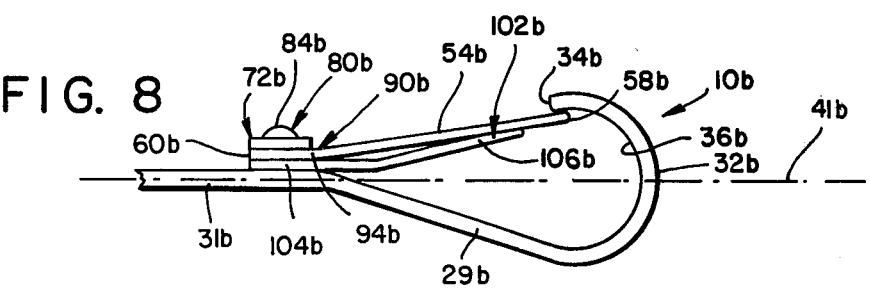
FIG. 8 is a fragmentary side plan view of a snap and buckle assembly, similar to FIG. 2, illustrating another embodiment of the present invention.
Figure 9:
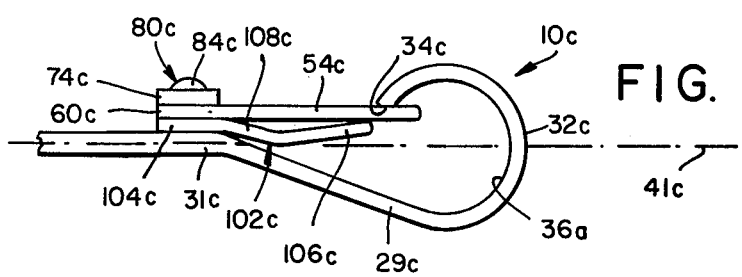
FIG. 9 is a fragmentary side plan view of a snap and buckle assembly similar to FIG. 2, illustrating another embodiment of the present invention.

Referring further to the drawings, there is illustrated in FIGS. 7 through 9 other embodiments of the present invention of a snap and buckle assembly. It has been found that it is desirable for certain applications to utilize an assembly having a locking member that has alternate ways for the resilient means to be obtained.

FIG. 7 illustrates a snap and buckle assembly 10a in which the resilient means 90a joins by an arcuate configuration 94a the wall 60a with the locking member 54a. This configuration provides for the free end 58a to remain in abutting engagement with the surface 36a. The central axis 41a permits the buckle element 38a of the buckle assembly 14a to remain in longitudinal alignment with the rear section 31a of the base 16a.

FIG. 8 illustrates another embodiment of the snap and buckle assembly 10b in which the locking member 54b may have a similar configuration to that illustrated in FIG. 7. In addition, in order to provide for a high positive pressure of the locking member 54b against the inner surface 36b adjacent the distal end 34b there is provided a secondary or supplemental pressure or resilient means 102b. The secondary resilient means 102b includes a rear member 104b and a front member 106b. The rear member 104b is mounted intermediate the wall 60b and the rear section 31b of the base 16b by the coupling means 80b.

The front member 106b is inclined upwardly relative to the rear member 104b in a manner to provide an upwardly directed force against the locking member 54b such that a high positive pressure exists which is to be overcome by depressing of the locking member 54b when required. The hook 32b is curved such that the central axis 41b extends through the rear section 31b.

FIG. 9 illustrates another embodiment of the snap and buckle assembly 10c having a central axis 41c and in which the locking member 54c may be flat from the wall 60c and abuts against the distal end 34c. To provide the desired positive force of the locking member 54c against the hook 32c there is provided secondary resilient means 102c which includes a rear member 104c and a front member 106c. There is an intermediate or middle section 108c that may extend downwardly from the rear member 104c and the front member 106c extends upwardly therefrom and applies the necessary force to maintain the locking member 54c in engagement with the distal end 34c.

Referring further to the drawings, there is illustrated in FIGS. 10 through 13 another embodiment of the present invention of a snap and buckle assembly 10d. It has been found that it is desirable for certain applications that the user of the assembly 10d have knowledge of the fact when the buckle member 40d is not seated in the position illustrated in FIG. 10. To accomplish this end there is provided indicating means 110a for apprising the user of the snap assembly 12d when the buckle element 38d is interposed between the inner surface 36d of the hook 32d and the free end 58d of the locking member 54d.

The indicating means 110d may include a groove 112d extending transversely through the base 16d and disposed substantially centrally between the sides 26d of base 16d. A closing member 114d having a terminal end 115d, that is integrally formed with the locking member 54d and extending towards the base 16d is provided. The closing member 114d being in alignment with the groove 112d for movement therein. The terminal end 115d of the closing member 114d being disposed above the lower surface 24d in the normal position of the locking member 54d. The terminal end 115d of the closing member 114d being disposed beyond the lower surface 24d when the buckle element 38d is interposed intermediate the inner surface 36d of the hook 32d and the locking member 54d such that the user of the snap assembly 12d may readily determine that the buckle element 38d is improperly positioned.

Figure 11:
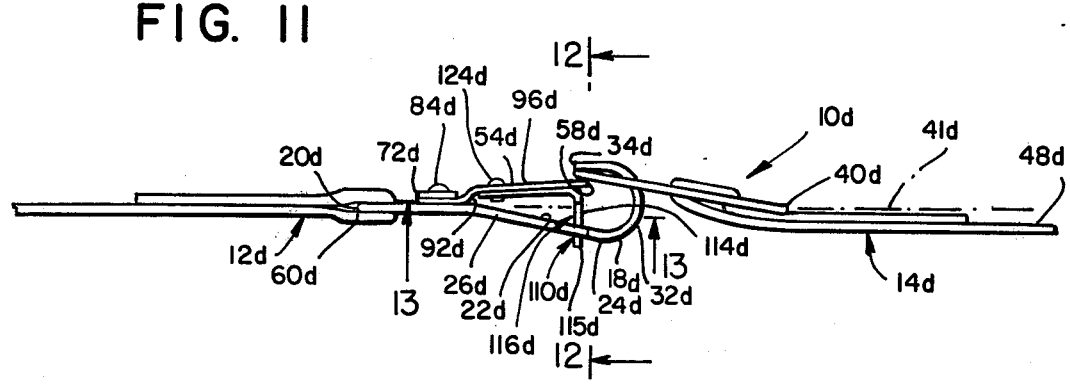
FIG. 11 is a side plan view of the snap and buckle assembly illustrated in FIG. 10.
Figure 12:
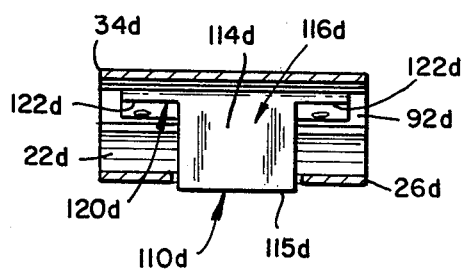
FIG. 12 is a sectional view taken along lines 12—12 of FIG. 11.
Figure 13:
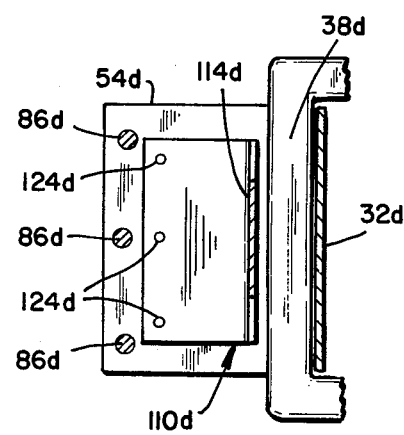
FIG. 13 is a sectional view taken along lines 13—13 of FIG. 12.

In this manner, as illustrated in FIG. 11, the terminal end 115d is easily both visible and may be readily detected by a finger of the user. When the terminal end 115d protrudes beyond lower surface 24d, the user is immediately apprised that the buckle 14d is improperly positioned. This is an important safety feature for the user.

Figure 10:
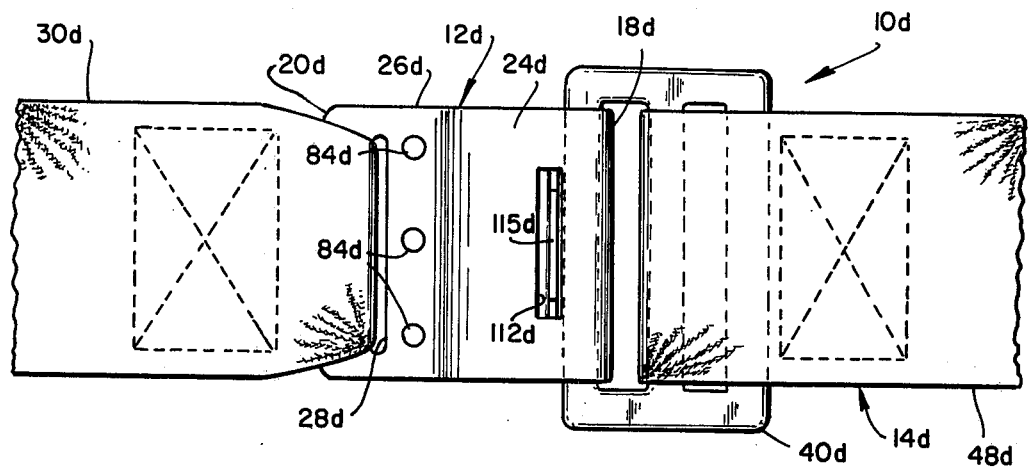
FIG. 10 is a bottom plan view of the snap and buckle assembly of another embodiment of the present invention.

There is also provided in this embodiment closing means 116d that may act in combination with the indicating means 110d or independently thereof. The closing means 116d includes the closing member 114d and is provided such that the normal position of the closing member 115d, as illustrated in FIG. 10, the terminal end 115d is positioned within the groove 112d. In this manner when the buckle member 40d is confined within the hook 32a the terminal end 108d may be flush with surface 24d. The stop member in this instance is the rear wall of groove 112d, which prevents rearward movement of the closing member 114d by any force applied thereagainst by the buckle element 38a.

In contrast to the prior art, by maintaining the terminal end 115d within the groove 112d, then the rearward wall of groove 112d acts as a stop member to confine any rearward displacement of the closing member 114d. The free end 58d of the locking member 54d is adapted to engage the inner surface 36d of hook 32d.

The closing member 106d may have associated therewith travel limit means 120d in the form of a pair of steps 122d that extend above the clip 96d and below the terminal end 115d. The limit means 120d control the displacement of the clip 96d towards the base 16d.

The indicating means 110d may be integrally formed with the locking member 54d, or individually formed and connected thereto as by rivets 124d.

Accordingly, it will be appreciated that the snap and buckle assembly of the present design may be used wherever it is desired to provide a strong reliable quick release snap assembly that can be provided with the various features enumerated herein. Various materials may be selected to obtain the desired end results.

Although illustrative embodiments of the invention have been described in detail herein with reference to the accompanying drawings, it is to be understood that the invention is not limited to these precise embodiments and that various changes and modifications may be effected therein without departing from the scope or spirit of the invention.

We claim:

1. A snap assembly adapted to receive a cooperating buckle element having a harness or the like secured thereto, said snap assembly comprising:

A. a base having oppositely disposed front and rear ends, with upper and lower surfaces intermediate said ends, and spaced apart sides extending between said front and rear ends, said rear end adapted to have a harness or the like secured thereto, B. said base including a front section terminating in said front end and a rear section terminating in said rear end, said front section being angularly disposed relative to said rear section, C. a hook integrally formed with said front end of said base and extending inwardly in the direction of said rear end and terminating in a distal end, D. said hook having an inner surface bounding one side of said hook facing said upper surface of said base for forming an enclosure for receiving the buckle element therein with a harness or the like extending therefrom, E. means for preventing racking of said buckle element relative to said enclosure, said means for preventing racking including a central axis extending transversely between said sides and is substantial longitudinal alignment with said rear section such that racking of the snap assembly is prevented when said buckle element abuts against said hook when each said harness or the like has an oppositely directed force applied thereto, F. a flexible locking member adapted to be moved relative to said inner surface of said hook, said locking member having an outer end and a oppositely disposed free end, with spaced apart sides intermediate said ends, said outer end formed by a wall having one surface thereof extending in overlapping relationship with and secured to said base, the width of said base and said locking member as defined respectively by each of said spaced apart sides being substantially equal to each other, G. load distribution means extending in overlapping relationship to the oppositely disposed surface of said wall, said load distribution means including a plate extending transversely between said spaced apart sides of said base and said locking member, H. coupling means for securing said base, said wall, and said plate to each other, such that any load on said wall is distributed across said plate, said coupling means comprises a plurality of spaced apart fasteners, I. resilient means for continuously urging said free end of said locking member into abutting pressural engagement with said inner surface of said hook and being movable toward and away from said inner surface, and J. said resilient means comprising:
 (1) a rib integrally joined by an arcuate configuration at one end thereof with said wall and extending upwardly therefrom,
 (2) a clip integrally joined by an arcuate configuration at one end thereof with the other end of said rib, said arcuate configurations each being in the form of radii that are substantially conformal to each other with said clip terminating in said free end of said locking member and inclined upwardly relative to said base for movement relative thereto, and
 (3) said movement of said locking member providing an angle of deflection in said clip and in said rib so as to obtain a relatively large translation of said free end of said locking member while maintaining a relatively low stress concentration in said locking member by distribution of said stress in each said arcuate configuration, K. supplemental resilient means mounted intermediate said base and said locking member, said supplemental resilient means inclined relative to said locking member so as to apply an upwardly directed force thereagainst such that a high positive force is required to depress said locking member, and L. said supplemental resilient means includes a rear member fixedly secured to said base and a front member inclined upwardly against said locking member adjacent said free end thereof.

2. A snap assembly as in claim 1, including a slot extending transversely on said base adjacent said rear end for receiving a harness therethrough.

3. A snap assembly as in claim 1, wherein said fasteners are rivets.

4. A snap assembly as in claim 1, wherein said angle of deflection of said clip and said rib are substantially equal to each other.

5. A snap assembly as in claim 1, wherein each of said arcuate configurations are substantially conformal to each other.

6. A snap assembly as in claim 5, wherein each of said arcuate configurations is in the form of a radius.

7. A snap assembly as in claim 6, wherein each said radius is in the range of 0.010 inches to 0.100 inches and said inner surface of said hook includes a circular configuration having a radius coinciding with said central axis.

8. A snap assembly as in claim 1, including indicating means for apprising the user of the snap assembly when the buckle element is interposed between said inner surface of said hook and said free end of said locking member, said indicating means comprises
   a. a groove extending transversely through said base,
   b. a closing member having a terminal end, said closing member being integrally formed with said locking member and extending towards said base,
   c. said closing member being in alignment with said groove for movement therein,
   d. said terminal end of said closing member disposed above said lower surface in the normal position of said locking member, and
   e. said terminal end of said closing member being disposed beyond said lower surface when the buckle element is interposed intermediate said inner surface of said hook and said locking member, such that the user of the snap assembly may readily determine that the buckle element is improperly positioned.

9. A snap assembly adapted to receive a cooperating buckle element having a harness or the like secured thereto, said snap assembly comprising:
   A. a base having oppositely disposed front and rear ends, with upper and lower surfaces intermediate said ends, and spaced apart sides extending between said front and rear ends, said rear end adapted to have a harness or the like secured thereto,
   B. said base including a front section terminating in said front end and a rear section terminating in said rear end, said front section being angularly disposed relative to said rear section,
   C. a hook integrally formed with said front end of said base and extending inwardly in the direction of said rear end and terminating in a distal end,
   D. said hook having an inner surface bounding one side of said hook facing said upper surface of said base for forming an enclosure for receiving the buckle element therein with a harness or the like extending therefrom,
   E. means for preventing racking of said buckle element relative to said enclosure, said means for preventing racking including a central axis extending transversely between said sides and in substantial longitudinal alignment with said rear section such that racking of the snap assembly is prevented when said buckle element abuts against said hook when each said harness or the like has an oppositely directed force applied thereto,
   F. a flexible locking member adapted to be moved relative to said inner surface of said hook, said locking member having an outer end and an oppositely disposed free end with spaced apart sides intermediate said ends, said outer end formed by a wall having one surface thereof extending in overlapping relationship with and secured to said base, the width of said base and said locking member as defined respectively by each of said spaced apart sides being substantially equal to each other,
   G. load distribution means extending in overlapping relationship to the oppositely disposed surface of said wall, said load distribution means including a plate extending transversely between said spaced apart sides of said base and said locking member,
   H. coupling means for securing said base, said wall, and said plate to each other, such that any load on said wall is distributed across said plate, said coupling means comprises a plurality of spaced apart fasteners,
   I. resilient means for continuously urging said free end of said locking member into abutting pressural engagement with said inner surface of said hook and being movable toward and away from said inner surface,
   J. said resilient means comprises:
      (1) a rib integrally joined by an arcuate configuration at one end thereof with said wall and extending upwardly therefrom,
      (2) a clip integrally joined by an arcuate configuration at one end thereof with the other end of said rib, said clip terminating in said free end of said locking member and inclined upwardly relative to said base for movement relative thereto, and
      (3) said movement of said locking member providing an angle of deflection in said clip and in said rib so as to obtain a relatively large translation of said free end of said locking member while maintaining a relatively low stress concentration in said locking member by distribution of said stress in each said arcuate configuration,
   K. supplemental resilient means mounted intermediate said base and said locking member, said supplemental resilient means inclined relative to said locking member so as to apply an upwardly directed force thereagainst such that a high positive force is required to depress said locking member, and
   L. said supplemental resilient means includes a rear member fixedly secured to said base and a front member inclined upwardly against said locking member.

10. A snap assembly as in claim 9, wherein said resilient means includes an arcuate configuration on said locking member intermediate said outer end and said free end.

11. A snap assembly as in claim 9, including a slot extending transversely on said base adjacent said rear end for receiving a harness therethrough.

12. A snap assembly as in claim 9, wherein said fasteners are rivets.

13. A snap assembly as in claim 9, wherein said angle of deflection of said clip and said rib are substantially equal to each other.

14. A snap assembly as in claim 9, wherein said locking member is substantially flat between the respective ends thereof.

15. A snap assembly as in claim 14, wherein
   a. said supplemented resilient means includes a front member for abutting engagement with said locking member and a rear member mounted intermediate said base and said locking member, and
   b. said front member being upwardly inclined so as to apply a force against said locking member such that a high positive force is required to depress said locking member.

16. A snap assembly as in claim 9, wherein said resilient member comprises:
   a. a rib integrally joined by an arcuate configuration at one end thereof with said wall and extending upwardly therefrom,
   b. a clip integrally joined by an arcuate configuration at one end thereof with the other end of said rib, said clip terminating in said free end of said locking member and inclined upwardly relative to said base for movement relative thereto,
   c. said movement of said locking member providing an angle of deflection in said clip and in said rib so as to obtain a relatively large translation of said free end of said locking member while maintaining a relatively low stress concentration in said locking member by distribution of said stress in each said arcuate configuration, and
   d. said angle of deflection of said clip and said rib are substantially equal to each other, and each of said arcuate configurations are substantially conformal to each other.

17. A snap and buckle assembly comprising in combination:
   A. a base having oppositely disposed front and rear ends with upper and lower surfaces intermediate said ends as well as spaced apart sides extending between said front and rear ends, and with a harness extending outwardly from said rear end,
   B. said base including a front section terminating in said front end and a rear section terminating in said rear end, said front section being angularly disposed relative to said rear section,
   C. a hook integrally formed with said front end of said base and extending inwardly in the direction of said rear end and terminating in a distal end,
   D. said hook having an inner surface bounding one side of said hook facing said upper surface of said base for forming an enclosure for receiving a buckle element therein,
   E. a flexible locking member adapted to be moved relative to said inner surface of said hook, said locking member having an outer end and an oppositely disposed free end, with spaced apart sides intermediate said ends, said outer end formed by a wall having one surface thereof extending in overlapping relationship with and secured to said base, the width of said base and said locking member as defined respectively by each of said spaced apart sides being substantially equal to each other,
   F. load distribution means extending in overlapping relationship to the oppositely disposed surface of said wall, said load distribution means including a plate extending transversely between said spaced apart sides of said base and said locking member,
   G. coupling means for securing said base, said wall, and said plate to each other, such that any load on said wall is distributed across said plate, said coupling means comprises a plurality of spaced apart fasteners,
   H. a buckle having a buckle element at one end thereof and a harness extending outwardly from the oppositely disposed end of said buckle,
   I. said buckle element having a width less than the spacing between said upper surface of said base and said inner surface of said hook so as to readily assume random positions relative to said base and be inserted and removed from said hook when said free end of said locking member is depressed,
   J. means for preventing racking of said buckle element relative to said enclosure, said means for preventing racking including a central axis extending transversely between said sides and in substantial longitudinal alignment with said rear section such that racking of the snap and buckle assembly is prevented when said buckle element abuts against said hook when each said harness or the like has an oppositely directed force thereto,
   K. resilient means for continuously urging said free end of said locking member into abutting pressural engagement with said inner surface of said hook and being movable toward and away from said inner surface,
   L. said resilient means comprises:
      (1) a rib integrally joined by an arcuate configuration at one end thereof with said wall and extending upwardly therefrom,
      (2) a clip integrally joined by an arcuate configuration at one end thereof with the other end of said rib, said clip terminating in said free end of said locking member and inclined upwardly relative to said base for movement relative thereto, and
      (3) said movement of said locking member providing an angle of deflection in said clip and in said rib so as to obtain a relatively large translation of said free end of said locking member while maintaining a relatively low stress concentration in said locking member by distribution of said stress in each said arcuate configuration,
   M. indicating means for apprising the user of the snap assembly when the buckle element is interposed between said inner surface of said hook and said free end of said locking member,
   N. said indicating means comprises:
      (1) a groove extending transversely through said base,
      (2) a closing member having a terminal end, said closing member being integrally formed with said locking member and extending towards said base,
      (3) said closing member being in alignment with said groove for movement therein,
      (4) said terminal end of said closing member disposed above said lower surface in the normal position of said locking member, and
      (5) said terminal end of said closing member being disposed beyond said lower surface when the buckle element is interposed intermediate said inner surface of said hook and said locking member, such that the user of the snap assembly may readily determine that the buckle element is improperly positioned,
   O. supplemental resilient means mounted intermediate said base and said locking member, said supplemental resilient means inclined relative to said locking member so as to apply an upwardly directed force thereagainst such that a high positive force is required to depress said locking member, and P. said supplemental resilient means includes a rear member fixedly secured to said base and a front member inclined upwardly against said locking member.

18. A snap and buckle assembly as in claim 17, wherein said resilient means includes an arcuate configuration on said locking member intermediate said outer end and said free end.

19. A snap and buckle assembly as in claim 17, including a slot extending transversely on said base adjacent said rear end for receiving a harness therethrough.

20. A snap and buckle assembly as in claim 17, wherein said angle of deflection of said clip and said ribs are substantially equal to each other.

21. A snap and buckle assembly as in claim 17, wherein each of said arcuate configurations are substantially conformal to each other and in the form of a radius.

22. A snap and buckle assembly as in claim 17, wherein said locking member is substantially flat between the respective ends thereof.

23. A snap and buckle assembly as in claim 22, wherein a. said supplement resilient means includes a front member for abutting engagement with said locking member and a rear member mounted intermediate said base and said locking member, and b. said front member being upwardly inclined so as to apply a force against said locking member such that a high positive force is required to depress said locking member.

* * * * *